United States Patent Office 3,514,424
Patented May 26, 1970

1

3,514,424
FLAME RETARDANT COMPOSITIONS
Maynard G. Noble, Troy, and James R. Brower, Latham, N.Y., assignors to General Electric Company, a corporation of New York
No Drawing. Continuation of application Ser. No. 463,898, June 14, 1965. This application May 19, 1969, Ser. No. 830,191
Int. Cl. C08g 51/04; C08k 1/02
U.S. Cl. 260—37      11 Claims

ABSTRACT OF THE DISCLOSURE

A silicone elastomer stock that exhibits improved flame resistance in the cured state constisting essentially of a silicone elastomer, a filter, and a small amount of a flame retardant material selected from the group consisting of platinum and platinum-containing materials.

---

This application is a continuation of application Ser. No. 463,898 filed June 14, 1965.

This invention relates to organopolysiloxane compositions having improved flame-retardant properties. More particularly, this invention is concerned with a composition of matter which, in the cured state, exhibits improved flame-retardant properties and which comprises, (1) an organopolysiloxane convertible to the cured, solid, elastic state and consisting essentially of silicon atoms, oxygen atoms, and organic groups selected from the class consisting of methyl radicals, aromatic radicals selected from the class consisting of aryl and halogenated aryl radicals, and vinyl radicals, from 0 to 35 mol percent of the organic groups being silicon-bonded aryl or halogenated aryl radicals and from 0 to 2% of the organic groups being silicon-bonded vinyl radicals, there being from 1.98 to 2.05 organic groups per silicon atom, (2) a finely divided inorganic filler, and (3) a material containing platinum.

Cured, solid, elastic organopolysiloxane, hereinafter referred to as "silicone rubbers," whether vulcanized by means of heat in the presence of organic peroxides or other organic curing agents, or when vulcanized with high energy electrons are known to have good heat resistance at elevated temperatures, such as 150°–250° C., and even higher. However, in certain applications, particularly in wire coating, it has been found that these silicone rubbers do not have the desired flame retardancy.

Although I do not wish to be bound by theory, it is probable that the organic groups in the organopolysiloxane structure continue to burn unless extinguished by external means, even when the silicone rubber is filled with an inorganic filler, such as finely divided forms of silicon dioxide. When flame retardancy is an important requirement, as in molded or extruded parts, these silicone rubbers cannot be utilized even though they are completely adequate for many other uses.

A method for improving the flame retardancy of a silicone rubber is shown in U.S. Pat. 2,891,033—Savage, where a finely divided cupreous material is combined with other components of a silicone rubber to impart flame retardancy. However, while this additive does improve the flame retardancy of most silicone rubbers and is entirely adequate for some uses, the combination of the polymer with the copper compound results in an extremely dark colored composition which makes it very difficult to provide a wide range of colors, as is often necessary with silicone rubber, for example in color-coding of multi-conductor cables. The dark color can be masked to a degree, but the agents which are employed for such masking, for example, titanium dioxide, do not fully hide the dark color and, additionally, detract to a degree from the flame retardancy. The same problem of coloration is present, to a degree, in the composition described in U.S. Pat. 3,154,515—Berridge, where copper, copper oxides, or copper halides are utilized as a flame retardant additive for organopolysiloxane compositions which are convertible to the cured, solid, elastic state at room temperature.

In accordance with the present invention, it has unexpectedly been discovered that by incorporating a small amount of a platinum-containing material in a filled silicone rubber composition containing no silicon-bonded hydrogen, the burning time and percentage of the composition which is consumed are markedly reduced. The platinum-containing materials which are employed are, in general, those which are well known to the art as catalysts for the addition of the hydrogen of an SiH group across the unsaturated bond of an Si-olefin material.

The organopolysiloxane which is convertible to the cured, solid, elastic state can be any of the organopolysiloxane gums known in the art which fall within the composition range stated above and have a viscosity of from about 5,000,000 to 50,000,000 centistokes. These organopolysiloxanes are advantageously obtained by condensing a diorganodihydrolyzable silane, for example, dimethyldichlorosilane, with or without small amounts of monoorganotrihydrolyzable silanes or triorganomonohydrolyzable silanes, for example, methyltrichlorosilane, trimethylchlorosilane, etc., and thereafter effecting condensation of the hydrolysis product using a condensing agent, for instance, an alkaline condensing agent, such as potassium hydroxide, sodium hydroxide, etc., or an acidic condensing agent, such as ferric chloride, etc. Alternately, cyclic polymers of dimethylsiloxane can be condensed with an alkaline condensing agent to give the desired organopolysiloxane which is convertible to the cured, solid, elastic state. Whatever the method of formation of the convertible organopolysiloxane, the final material can contain up to 35 mol percent of phenyl radicals bonded by silicon-carbon links and up to 2% of vinyl radicals bonded through silicon-carbon links. Thus, when the convertible material is formed by hydrolysis, a portion of the starting material can be diphenyldihydrolyzable silane, methylphenyldihydrolyzable silane, methylvinyldihydrolyzable silane, divinyldihydrolyzable silane, etc., or the monoorganothrihydrolyzable or triorganomonohydrolyzable silanes containing these radicals.

It is essential to the production of truly flame retardant compositions that a quantity of a filler be present. In general any filler system which is residually non-alkaline, i.e., acidic or neutral, can be employed. Any of the finely divided silica fillers, generally used for silicone rubber, such as, silica aerogel, fumed silica, ground quartz, and finely divided silica treated with organosilicon materials, e.g., trimethylchlorosilane, etc., can be employed. The treatment of silica fillers with organosilicon materials are as described, e.g., in U.S. Pats. 2,938,009—Lucas and 3,004,859—Lichtenwalner. The amount of filler present can vary within wide ranges, from 10 to 300 parts of filler per 100 parts of the organopolysiloxane gum. Preferably, the filler is present in an amount of from 40 to 125 parts per 100 parts of the organopolysiloxane gum. Up to about ⅔ of the total silica filler can be replaced by such materials as carbon black, titanium dioxide, or diatomaceous earth, or a combination of these materials, so long as a residual alkalinity in the filler system does not result. However, while clay has often been employed as a filler for silicone rubber, it has unexpectedly been found that convertible organopolysiloxane materials filled with alkaline clay, alone, do not exhibit the flame retardancy shown by the materials filled with a finely divided silica or a mixture of silica with one or more of the other materials mentioned previously.

The platinum-containing material which is used is, as previously mentioned, any of the materials generally utilized in SiH—Si-olefin reactions. Among the forms of this platinum are elemental platinum, as shown in U.S. Pat. 2,970,150—Bailey and platinum-on-charcoal, platinum-on-gamma-alumina, platinum-on-silica gel, platinum-on-asbestos, and chloroplatinic acid $$(H_2PtCl_6 \cdot 6H_2O)$$

as mentioned in Pat. 2,823,218—Speier. Further, the platinum-containing material can be selected from those having the formula $(PtCl_2 \cdot olefin)_2$ and $H(PtCl_3 \cdot olefin)$, as described in U.S. Pat. 3,159,601—Ashby. The olfin shown in the previous two formulas can be almost any type of olefin, but is preferably an alkene having from 2 to 8 carbon atoms, a cycloalkene having from 5 to 7 carbon atoms, or styrene. Specific olefins utilizable in the above formulas are ethylene, propylene, the various isomers of butylene, octylene, cyclopentene, cyclohexene, cycloheptene, etc. A further platinum-containing material usable in the composition of the present invention is the platinum chloride cyclopropane complex $(PtCl_2 \cdot C_3H_6)_2$ described in U.S. Pat. 3,159,662—Ashby.

Still further, the platinum-containing material can be a complex formed from chloroplatinic acid with up to two mols per gram-atom of platinum of a member selected from the class consisting of alcohols having the formula ROH, ethers having the formula ROR', aldehydes having the formula RCHO and mixtures of the above as described and claimed in the copending application of Harry F. Lamoreaux, Ser. No. 207,076, filed July 2, 1962, and assigned to the same assignee as the present invention. The substituent R in the above formulas is a member selected from the class consisting of alkyl radicals having at least 4 carbon atoms, alkyl radicals substituted with an aromatic hydrocarbon radical, and alkyl radicals substituted with an OR' group, where R' is a member selected from the class consisting of monovalent hydrocarbon radicals free of aliphatic unsaturation and monovalent radicals free of aliphatic unsaturation and consisting of carbon, hydrogen, and oxygen atoms, with each oxygen atom being attached to two atoms, at least one of which is a carbon atom and up to one of which is a hydrogen atom.

Small, but effective, amounts of the platinum-containing material are sufficient to impart the desired flame retardancy to the silicone rubber. In general, amounts of from 3 to 250 parts per million, as platinum, based on the organopolysiloxane gum, can be used. Preferably, the amount is from 25 to 100 p.p.m., as platinum, based on the organopolysiloxane gum. The platinum-containing material can be employed in amounts greater than 250 parts per million, but, due to the cost of the materials, utilization of greater than 250 parts per million is not preferred as the increased amounts do not provide significant improvement in the flame retardancy of the final material.

It is particularly surprising that the platinum-containing materials should be found, in conjunction with a non-alkaline filler system, to provide flame retardancy in a silicone rubber. Very often, other noble metal-containing compositions have been considered equivalent to platinum in promoting the addition of the hydrogen atom of the SiH group across the unsaturated bond of an Si-olefin group. Included among these noble metals are ruthenium, rhodium, iridium, palladium, and osmium. That the effect of the platinum in the present invention is not of the same catalytic type is demonstrated by the fact that others of the generally equivalent noble metals do not provide the desired flame retardancy. For example, a palladium-on-charcoal catalyst containing 10% palladium was incorporated into a polydimethylsiloxane gum containing 0.2% vinyl radicals, and 41.5 parts of fumed silica and 65 parts of ground quartz, per 100 parts of the organopolysiloxane, and the composition was cured with 1% of benzoyl peroxide for 1 hour at 300° F. In the flame test, 100% of the composition was consumed whether the palladium content was 40 parts per million or 100 parts per million.

While the previously described organopolysiloxane gum, silica filler or combination of silica filler with others of the enumerated fillers, and platinum-containing material are essential to the production of a flame-retardant silicone rubber composition, other materials can be added without impairing this flame retardant property. Some of these additional materials may even enhance the flame retardancy. Among the additional materials which can be added are rubber process aids, such as alkoxy-containing, hydrocarbon-substituted polysiloxane fluids as described in U.S. Pat. 2,954,357—Fekete and hydroxylated silanes as described in U.S. Pat. 2,890,188—Konkle et al. Additionally, resinous organopolysiloxane materials such as those formed from tetrafunctional alkylsilicates, triorganomonofunctional silanes, and, in some cases, difunctional diorganosilanes, as disclosed and claimed in U.S. Pat. 2,857,356—Goodwin, Jr., can also be employed.

The order of addition of the various components to the composition is immaterial. All can be added simultaneously, or the filler, platinum-containing material, and additional materials, when they are present, can be added at varying times to the organopolysiloxane gum and a homogeneous blend obtained. Following blending of the various materials, the material is cured using any of various curing agents as, for example, benzoyl peroxide, tertiary butyl perbenzoate, bis-(2,4-dichlorobenzoyl) peroxide, etc. These curing agents can be present in varying amounts ranging from about 0.3% to as high as 6 to 10%, by weight, or more, based on the weight of the organopolysiloxane gum. Further, the convertible organopolysiloxane gum can be cured by any other method known in the art without adversely affecting the flame retardant properties imparted by the filler and platinum-containing material. Cure is accomplished with the various peroxide and perbenzoate catalysts by heating with slight pressure at from about 100° to 200° C. for times ranging from 5 to 15 minutes. In addition to, or instead of this press cure, the silicone rubber composition can be treated at temperatures of from about 200° to 500° C. for sufficient time to assure complete conversion of the polysiloxane gum to a substantially infusible and insoluble state.

The process of the present invention will now be more fully illustrated. These illustrations should not be considered as limiting in any way the full scope of the present invention as covered in the appended claims.

In order to evaluate the flame retardant properties of the silicone rubber compositions described in the examples, a test was employed which consisted of suspending a cured strip of the silicone rubber, having dimensions of 0.5 in. by 6 in. by 0.075 in. from a metal wire in a glass chimney in a draft-free atmosphere over a blue flame (approximately 1100° C.) in such a manner that the tip of this strip is suspended 1 in. into the flame. The strip is held in the flame for a period of 20 seconds, at which time the flame is removed and the time required for complete extinguishment of the flame is measured. The time is recorded as the "burning time," in seconds. The test strip is then freed of loose ash and weighed to determine the "percent consumed" by the fire. A material which burned for less than 140 seconds and was no more than 50% consumed was considered sufficiently flame retardant.

EXAMPLES 1–5

A series of runs were made to show the effectiveness of the filler-platinum system with a polydimethylsiloxane gum. Each formulation included 100 parts of a polydimethylsiloxane gum having an approximate average viscosity of 7,500,000 centistokes, and 40 parts of a silica aerogel. Each of the formulations was press cured using, as a catalyst, about 2.2 parts of a composition containing about 50% bezoyl peroxide in a polydimethylsiloxane fluid having a viscosity at 25° C. of 1300 centistokes. The platinum was incorporated using a methanol solution of chloroplatinic acid. Table I shows the parts per million of platinum based on the polydimethylsiloxane gum, the burning time, and the percent consumed in the flame retardancy test.

TABLE I

| Example | Pt, p.p.m. | Burning Time (seconds) | Percent consumed |
| --- | --- | --- | --- |
| 1 | 0 | 187 | 100 |
| 2 | 5.3 | 115 | 50 |
| 3 | 27 | 107 | 50 |
| 4 | 53 | 105 | 50 |
| 5 | 121 | 94 | 50 |

Thus, it can easily be seen that the incorporation of the minimum quantity of silica filler with between 5 and 121 parts per million of platinum, based on the polysiloxane gum, significantly reduces the burning time of a material which is otherwise completely consumed by flame and, further, reduces the percent consumed by the flame to only 50 percent.

EXAMPLES 6–7

These examples illustrate the effect of a filler which is slightly alkaline on the flame retardancy of a silicone rubber which includes platinum, as otherwise disclosed in this invention. The organopolysiloxane gum was the same as that employed in Examples 1 through 5 in an amount of 100 parts. The filler, in this case, was diatomaceous earth composed of almost 90% silica, but additionally containing between 5 and 10% of potassium oxide, iron oxide, and aluminum oxide. Each composition was cured for 24 hours at 480° F. with 5 parts of a composition containing 50% of benzoyl peroxide in a polydimethylsiloxane fluid having a viscosity at 25° C. of 1300 centistokes. Without platinum, the composition described above burned for approximately 130 seconds and was entirely consumed in the flame. The platinum was obtained by dissolving 1 mole of $H_2PtCl_6 \cdot 6H_2O$ in 7 moles of octyl alcohol. This platinum-alcohol solution was maintained at a temperature of 70°–80° C. and a pressure of approximately 15 to 20 mm. for 60 hours while the ratio of chlorine to platinum was reduced to 2 atoms of chlorine per atom of platinum. The water and hydrogen chloride which resulted were removed by holding the temperature at 70°–80° C. The resulting product will hereinafter be referred to as the organic platinum complex. Addition of about 68 p.p.m. as platinum, based on the organopolysiloxane gum, reduced the burning time of the composition described above to 90 seconds and the percent consumed to 67%, a significant reduction, but beyond the range which would be considered acceptable.

EXAMPLES 8–9

The effectiveness of a composition of the present invention in retarding flame was demonstrated in these examples employing 100 parts of a polydimethylsiloxane gum having an approximate viscosity of 7,500,000 centistokes where 0.2% of the silicon-bonded methyl groups were replaced with silicon-bonded vinyl groups. In addition, each composition contained 43 parts of a fumed silica treated with about 16% of octamethylcyclotetrasiloxane in accordance with the aforementioned Lucas patent. Example 8, which contained no platinum-containing material, was 100% consumed in the flame retardancy test. Example 9 had the same formulation as Example 8 except that it contained 133 p.p.m. of platinum, derived from the organic platinum complex, based on the organopolysiloxane gum. This material was press cured. It burned for 102 seconds and was 30–35% consumed in the flame retardancy test.

EXAMPLES 10–17

The organopolysiloxane gum employed in Examples 8 and 9 was also used in these examples in an amount of 100 parts. However, in each case, in addition to 43 parts of octamethylcyclotetrasiloxane-treated fumed silica and 100 parts of gum, each composition contained ground quartz. The platinum in Example 16 was added as the organic platinum complex, while in each of the other examples the platinum was derived from a 10% methanol solution of chloroplatinic acid hexahydrate. Table II, in addition to showing the data of Table I, shows the parts of ground quartz. In each case the material was cured with 1.1 parts of a composition containing 50% dichlorobenzoyl peroxide in a polydimethylsiloxane fluid having a viscosity of 1300 centistokes at 25° C.

TABLE II

| Ex. | Parts ground quartz | Pt, p.p.m. | Cure | Burning time (sec.) | Percent consumed |
| --- | --- | --- | --- | --- | --- |
| 10 | 65 | 0 | 1 hr. at 300° F | 150 | 100 |
| 11 | 65 | 78 | Press | 60 | 15 |
|  |  |  | 1 hr. at 300° F | 45 | 10 |
|  |  |  | 24 hrs. at 480° F | 25 | 10 |
|  |  |  | 96 hrs. at 480° F | 15 | 5 |
| 12 | 65 | 8 | Press | 72 | 25 |
| 13 | 65 | 40 | do | 62 | 10 |
| 14 | 65 | 80 | do | 66 | 15 |
| 15 | 65 | 181 | do | 65 | 10 |
| 16 | 122 | 245 | do | 60 | 10 |
|  |  |  | 20 min. at 300° F | 95 | 15–20 |

As can be seen from the examples above, the inclusion of the ground quartz does not adversely affect the flame retardancy of the silicone rubber with the platinum-containing material, when the filler and platinum are in the correct amounts. Additionally, mixtures of non-alkaline fillers have no adverse affect upon the ultimate flame retardancy.

EXAMPLES 17–20

These examples illustrate the substitution of a portion of the silica filler with a carbon black having a pH of about 7. This filler system provided flame retardancy essentially equivalent to the non-alkaline silica fillers, alone. Each composition contained 100 parts of a polydimethylsiloxane gum wherein 0.35% of the silicon-bonded methyl groups were replaced by silicon-bonded vinyl groups. Additionally, each composition contained 17 parts of untreated fumed silica and 30 parts of carbon black. Each of the formulations was press cured with 0.9 part of dicumyl peroxide. The platinum in each example was obtained from a 10% methanol solution of chloroplatinic acid hexahydrate. The results of the flame retardancy test for each of these examples, along with the p.p.m. of platinum contained in each of the formulations, based on the organopolysiloxane gum, are shown in Table III.

TABLE III

| Example | Pt, p.p.m. | Burning time (sec.) | Percent consumed |
|---|---|---|---|
| 17 | 0 | 180 | 100 |
| 18 | 5.7 | 132 | 50 |
| 19 | 29 | 88 | 35 |
| 20 | 57 | 73 | 30 |

Thus, it can be seen that flame retardancy is achieved when a portion of the non-alkaline silica filler is replaced by other fillers where the overall filler system has no residual alkalinity.

EXAMPLES 21–23

These examples demonstrate the ability to incorporate significant amounts of other polysiloxane materials into the silicone rubber composition, without impairing the flame retardancy of the final material. In each of these examples the composition contained 100 parts of the polydimethylsiloxane gum having about 0.2% of the silicon-bonded methyl groups replaced with silicon-bonded vinyl groups, previously described. Additionally, each contained 43 parts of the octamethylcyclotetrasiloxane treated fumed silica and a quantity of the resin described as Sample 1 of Example 1 of the aforementioned Goodwin, Jr., Pat. 2,857,356 (hereinafter referred to as MQD). Example 23 also contained 75 parts of ground quartz. In each case the material was cured for one hour at 300° F. using 1.5 parts of the dichlorobenzoyl peroxide-polydimethylsiloxane composition and the platinum was added in the form of the organic platinum complex. Table IV shows the amount of platinum, based on the organopolysiloxane gum, the amount of MQD, and the performance in the flame retardancy test.

TABLE IV

| Example | MQD (Parts) | Pt, p.p.m. | Burning time | Percent Consumed |
|---|---|---|---|---|
| 21 | 4.8 | 0 | 215 | 80–85 |
| 22 | 5.5 | 3 | 75 | 20 |
| 23 | 5.5 | 3 | 65 | 25 |

As can be seen from these examples, while the addition of a MQD material has little effect upon the flame retardancy of the silicone rubber, its inclusion has no adverse effect upon the rubber when the platinum-containing material is added.

EXAMPLES 24–25

Silicone rubber compositions comprising polymers having silicon-bonded phenyl groups are known to inherently possess a degree of flame retardancy. However, even the flame retardancy of these materials can be improved by incorporating a platinum-containing material into the rubber system. Two silicone rubber compositions were prepared with 100 parts of organopolysiloxane gum, 42 parts of fumed silica, 10.5 parts of diatomaceous earth, and 2 parts of titania. The polysiloxane gum was a methylphenylpolysiloxane having an approximate viscosity of 25,000,000 centistokes where the phenyl substituents constituted 5% of the total methyl and phenyl substituents. The compostion of each example was cured for one hour at 300° F. employing 4 parts of the previously described dichlorobenzoyl peroxide-polydimethylsiloxane blend. The platinum was added in the form of the organic platinum complex. In the flame retardancy test, the cured composition without platinum continued to burn for 85 seconds and was 35% consumed. However, the same composition, with 68 p.p.m. platinum, based on the organopolysiloxane gum, burned for 60 seconds and was only 5% consumed.

EXAMPLES 26–27

The performance of a composition containing methylphenylvinylpolysiloxane gum, filler, and platinum-containing material in accordance with the present invention is demonstrated by these examples. The organopolysiloxane was a gum having an approximate viscosity of 25,000,000 where about 5% of the silicon-bonded organic groups were phenyl and about 0.2% were vinyl, the remainder being methyl. Two compositions were formulated with 100 parts of the gum, 46 parts of octamethylcyclotetrasiloxane-treated fumed silica, and 14 parts of untreated fumed silica. Each of the compositions was cured for 1 hr. at 300° F. in the presence of about one part of the dichlorobenzoyl peroxidepolydimethylsiloxane material. The platinum was again added as the organic platinum complex. When tested in the flame retardancy test the material without platinum burned for 66 seconds and was 30% consumed, while the same material with 69 p.p.m. platinum, based on the organopolysiloxane gum, burned for 54 seconds and was less than 5% consumed.

EXAMPLE 28

A further indication of the need for a neutral or acidic filler is demonstrated in this example. A series of samples were prepared containing 100 parts of a polydimethylsiloxane gum having an approximate viscosity of 7,500,000 centistokes, 10 parts of a silica aerogel, and 120 parts of Whitetex clay. Four of the compositions were treated with a 10% solution of chloroplatinic acid hexahydrate in methanol to yield platinum contents of from 8 to 181 parts per million, based on the polysiloxane gum. In the flame retardancy test the press cured composition without platinum was 100% consumed and burned for 117 seconds. However, each of the other compositions was also 100% consumed, the only apparent affect of the platinum being to reduce the burning time from 115 seconds in the case of a content of 8 p.p.m. platinum, gradually to 68 seconds in the case of the material with 181 p.p.m. platinum.

With the exception of rubbers containing such coloring fillers as carbon black, each of the flame retardant silicone rubbers formulated according to the present invention is easily colored. Thus, a wide range of colored flame-retardant silicone rubbers is possible. The uses to which these materials can be put are generally the same as those recited in Pat. 2,891,033—Savage. Thus, they can be employed for electrical conductor insulation, gaskets, heater ducts, wrap-around tapes for elements which may be subjected to elevated temperatures, etc.

What we claim as new and desire to secure by Letters Patent of the United States is:

1. A composition of matter which in a cured state exhibits improved flame-retardant properties, the composition comprising:
(1) 100 parts of an organopolysiloxane gum convertible to the cured, solid, elastic state and consisting essentially of silicon atoms, oxygen atoms, and organic groups selected from the class consisting of methyl radicals, aromatic radicals selected from the class consisting of aryl and halogenated aryl radicals in an amount of from 0 to 35 mol percent of the organic groups, and from 0 to 2 mol percent of the total organic groups of vinyl radicals, there being from 1.98 to 2.05 organic groups per silicon atom,
(2) a finely divided, non-alkaline inorganic filler in an amount of from 10 to 300 parts, by weight, and
(3) small, but effective amount to impart flame retardancy of a platinum containing material not exceeding 250 parts per million, by weight based on the organopolysiloxane gum.

2. The cured product of claim 1.

3. The composition of claim 1 wherein the inorganic filler is present in an amount of from 40 to 125 parts.

4. The composition of claim 1 wherein the platinum-containing material is present in a range to provide from 3 to 250 parts per million, by weight based on the organopolysiloxane gum, of platinum.

5. The composition of claim 4 wherein from 25 to 100 parts per million of platinum are provided.

6. The composition of claim 1 wherein the inorganic filler is a silica aerogel.

7. The composition of claim 1 wherein the inorganic filler is a fumed silica.

8. The composition of claim 1 wherein the filler is a fumed silica treated with an organopolysiloxane.

9. The composition of claim 1 wherein the inorganic filler is a mixture of a fumed silica and ground quartz.

10. The composition of claim 1 wherein the filler is a mixture of fumed silica and carbon black.

11. The composition of claim 1 wherein the inorganic filler is a mixture of fumed silica, diatomaceous earth, and titanium dioxide.

References Cited

UNITED STATES PATENTS

| 2,943,073 | 6/1960 | Brantley | 260—41.5 |
| 3,162,722 | 12/1964 | Bartes | 260—37 |

FOREIGN PATENTS

| 1,324,145 | 3/1963 | France. |

OTHER REFERENCES

Atkins et al., Ind. & Eng. Chem.; 29, 1395, 1947.

MORRIS LIEBMAN, Primary Examiner

L. T. JACOBS, Assistant Examiner

U.S. Cl. X.R.

260—45.75